(12) United States Patent
Lim et al.

(10) Patent No.: US 9,671,714 B2
(45) Date of Patent: *Jun. 6, 2017

(54) LIGHT SCANNING UNIT AND IMAGE FORMING APPARATUS EMPLOYING THE SAME

(71) Applicant: SAMSUNG ELECTRONICS CO., LTD., Suwon-si, Gyeonggi-do (KR)

(72) Inventors: Sung-geun Lim, Seoul (KR); Gu-dal Kwon, Suwon (KR)

(73) Assignee: S-PRINTING SOLUTION CO., LTD, Suwon-si (KR)

( * ) Notice: Subject to any disclaimer, the term of this patent is extended or adjusted under 35 U.S.C. 154(b) by 18 days.

This patent is subject to a terminal disclaimer.

(21) Appl. No.: 14/702,290

(22) Filed: May 1, 2015

(65) Prior Publication Data

US 2015/0234308 A1 Aug. 20, 2015

Related U.S. Application Data

(63) Continuation of application No. 13/432,432, filed on Mar. 28, 2012, now Pat. No. 9,024,990.

(30) Foreign Application Priority Data

Aug. 3, 2011 (KR) ........................ 10-2011-0077375

(51) Int. Cl.
*H02K 29/08* (2006.01)
*G03G 15/043* (2006.01)
*G02B 26/10* (2006.01)

(52) U.S. Cl.
CPC .......... *G03G 15/043* (2013.01); *G02B 26/10* (2013.01)

(58) Field of Classification Search
USPC ....... 347/229, 231, 234, 235, 243, 248–250, 347/259–261
See application file for complete search history.

(56) References Cited

U.S. PATENT DOCUMENTS 6,794,636 B1* 9/2004 Cardillo ............. G01D 5/34715
250/227.11
6,888,560 B2* 5/2005 Jin ........................ G02B 26/127
347/235

(Continued)

FOREIGN PATENT DOCUMENTS

JP 2002-189180 7/2002
JP 2002189180 A * 7/2002
JP 2004240275 A * 8/2004

OTHER PUBLICATIONS

Notice of Allowance mailed Jan. 8, 2015 for corresponding U.S. Appl. No. 13/432,432.

(Continued)

*Primary Examiner* — Alejandro Valencia
(74) *Attorney, Agent, or Firm* — Staas & Halsey LLP

(57) ABSTRACT

A light scanning unit may include a light source to emit a light beam and a beam deflector to reflect and scan the light beam emitted from the light source in a main scanning direction. The light scanning unit may also include a beam detecting sensor to detect a horizontal synchronization signal by receiving a part of the light beam and may include a circuit board disposed in part of a trajectory of the light beam such that the light beam is incident on a first surface of the circuit board. The circuit board may include a through-hole formed in the circuit board in the trajectory of the light beam. The beam detecting sensor may be mounted to a second surface of the circuit board which is opposite to (Continued)

the first surface of the circuit board. The light beam may be incident on the beam detecting sensor via the through-hole.

18 Claims, 6 Drawing Sheets

(56) References Cited

U.S. PATENT DOCUMENTS

| | | | | |
|---|---|---|---|---|
| 6,969,846 | B2* | 11/2005 | Tanaka | G02B 26/124 |
| | | | | 250/235 |
| 7,755,596 | B2 | 7/2010 | Tsai et al. | |
| 9,024,990 | B2* | 5/2015 | Lim | B41J 2/471 |
| | | | | 347/235 |
| 2003/0025783 | A1* | 2/2003 | Mori | G02B 26/127 |
| | | | | 347/234 |
| 2006/0045149 | A1 | 3/2006 | Kasai | |
| 2008/0001246 | A1* | 1/2008 | Sengupta | H01L 25/18 |
| | | | | 257/459 |
| 2010/0200898 | A1* | 8/2010 | Lin | H01L 27/14618 |
| | | | | 257/294 |

OTHER PUBLICATIONS

Office Action mailed Aug. 8, 2014 for corresponding U.S. Appl. No. 13/432,432.
Office Action mailed Jul. 7, 2014 for corresponding U.S. Appl. No. 13/432,432.
Notice of Allowance mailed Mar. 20, 2014 for corresponding U.S. Appl. No. 13/432,432.
Office Action mailed Jun. 20, 2013 for corresponding U.S. Appl. No. 13/432,432.
Examiner Interview Summary mailed Sep. 5, 2014 for corresponding U.S. Appl. No. 13/432,432.
Restriction Requirement mailed May 6, 2013 for corresponding U.S. Appl. No. 13/432,432.
U.S. Appl. No. 13/432,432, filed Mar. 28, 2012, Sung-geun Lim et al., Samsung Electronics Co., Ltd.

* cited by examiner

LIGHT SCANNING UNIT AND IMAGE FORMING APPARATUS EMPLOYING THE SAME

CROSS-REFERENCE TO RELATED APPLICATIONS

This application is a continuation application of U.S. patent application Ser. No. 13/432,432 filed on Mar. 28, 2012 in the U.S. Patent and Trademark Office, the disclosure of which is incorporated herein in its entirety by reference. This application claims the benefit of priority under 35 U.S.C. §119 to Korean Patent Application No. 10-2011-0077375, filed on Aug. 3, 2011, in the Korean Intellectual Property Office, the disclosure of which is incorporated herein in its entirety by reference.

BACKGROUND

1. Field of the Invention

The present general inventive concept relates to a light scanning unit and an image forming apparatus employing the same, and more particularly, to a light scanning unit including a synchronization signal detecting unit that detects a horizontal synchronization signal and has an improved structure, and an image forming apparatus employing the light scanning unit.

2. Description of the Related Art

Light scanning units that scan light emitted from a light source onto a predetermined area are employed in various apparatuses and devices such as electrophotographic image forming apparatuses, scanning display devices, or the like.

Since the light scanning units form images by using scanned light, it is important to determine start and end positions of a scanning operation, and thus the light scanning units include a synchronization signal detecting unit for horizontally synchronizing the image.

For example, in electrophotographic image forming apparatuses, a light scanning unit forms an electrostatic latent image by scanning a light beam on a photoconductive drum. The formed electrostatic latent image is developed as a development image by using a developer, such as a toner, and the development image is transferred to a printing medium. In such an image forming apparatus, if a scanning position of the light beam scanned on the photoconductive drum is different for each scanning line, an image shift occurs, and a position where colors overlap with each other to form a color image is moved. The synchronization signal detecting unit included in the light scanning unit detects a part of the scanned light beam in order to determine a scanning position of the scanned light beam, and there is a need to minimize noise that may be generated in the synchronization signal detecting unit in order to form a high-resolution image.

SUMMARY OF THE INVENTION

Diffused reflection due to light reflected by a chip lead end of a conventional beam detecting sensor causes noise in a synchronization signal detecting unit, and thus the present general inventive concept provides a light scanning unit capable of preventing noise from being generated by improving a structure of the synchronization signal detecting unit capable of preventing the diffused reflection from occurring, and an image forming apparatus employing the light scanning unit.

Additional aspects and advantages of the present general inventive concept will be set forth in part in the description which follows and, in part, will be obvious from the description, or may be learned by practice of the general inventive concept.

Features and/or utilities of the present general inventive concept may be realized by a light scanning unit including a light source to emit a light beam, a beam deflector to reflect and scan the light beam emitted from the light source in a main scanning direction, a beam detecting sensor to detect a horizontal synchronization signal by receiving a part of the light beam reflected and scanned by the beam deflector, and a circuit board disposed in part of a trajectory of the light beam such that the light beam is incident on a first surface of the circuit board, the circuit board including a through-hole formed in the circuit board in the trajectory of the light beam, wherein the beam detecting sensor is mounted to a second surface of the circuit board which is opposite to the first surface of the circuit board, and the light beam is incident on the beam detecting sensor via the through-hole.

The light scanning unit may include electronic components to process signals input/output to/from the beam and mounted to the second surface of the circuit board.

The beam detecting sensor may be disposed to receive light beam corresponding to a starting end of a scanning line from among the light beam reflected and scanned by the beam deflector.

The beam detecting sensor may include a photo sensor integrated chip (IC).

The light scanning unit may further include a beam detecting lens disposed between the beam deflector and the beam detecting sensor to focus the light beam on the beam detecting sensor.

The light scanning unit may further include a beam detecting mirror disposed between the beam deflector and the beam detecting sensor to change a path of the light beam.

The beam deflector may be a polygonal rotating mirror or a microelectromechanical systems (MEMS) mirror.

The light source and the beam detecting sensor may be mounted on the circuit board.

The light source may be mounted on a light source side circuit board which is separate from the circuit board.

Features and/or utilities of the present general inventive concept may also be realized by a light scanning unit including a light source to emit a light beam, a beam deflector to reflect and scan the light beam emitted from the light source in a main scanning direction, a circuit board disposed in part of a trajectory of the light beam such that the light beam is incident on a first surface of the circuit board, a beam detecting sensor mounted on the first surface of the circuit board to detect a horizontal synchronization signal by receiving a part of the light beam reflected and scanned by the beam deflector, the beam detecting sensor including a plurality of terminals to output the horizontal synchronization signal and disposed such that the light beam is not incident on the plurality of terminals.

The plurality of terminals may be spaced apart from each other across a trajectory of the light beam at an interval that is at least larger than a spot of the light beam.

The plurality of terminals of the beam detecting sensor may be disposed on surfaces of the beam detecting sensor in a direction perpendicular to the traveling direction of the light beam.

The beam detecting sensor may be at least one of a ball grid array (BGA) and quad flat no-leads (QFN) type package.

The light scanning unit may include electronic components to process signals input/output to/from the beam detecting sensor and mounted on a second surface of the circuit board which is opposite to the first surface of the circuit board.

The beam detecting sensor may be disposed to receive light beam corresponding to a starting end of a scanning line from among the light beam reflected and scanned by the beam deflector.

The beam detecting sensor may be a photo sensor integrated chip (IC).

The light scanning unit may further include a beam detecting mirror disposed between the beam deflector and the beam detecting sensor to change a path of the light beam.

The light source and the beam detecting sensor may be mounted on the circuit board.

The light source may be mounted on a light source circuit board separate from the circuit board.

Features and/or utilities of the present general inventive concept may also be realized by an electrophotographic image forming apparatus including a photoreceptor, a light scanning unit to form an electrostatic latent image by scanning light on a surface to be scanned of the photoreceptor, and a developing unit to develop the electrostatic latent image formed in the photoreceptor by supplying a toner to the electrostatic latent image, wherein the light scanning unit includes a light source to emit a light beam, a beam deflector to reflect and scan the light beam emitted from the light source in a main scanning direction, a beam detecting sensor to detect a horizontal synchronization signal by receiving a part of the light beam reflected and scanned by the beam deflector, and a circuit board disposed in part of the trajectory of the light beam such that the light beam is incident on a first surface of the circuit board, the circuit board including a through-hole formed in the circuit board in the trajectory of the light beam, wherein the beam detecting sensor is mounted to a second surface of the circuit board which is opposite to the first surface of the circuit board, and the light beam is incident on the beam detecting sensor via the through-hole.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
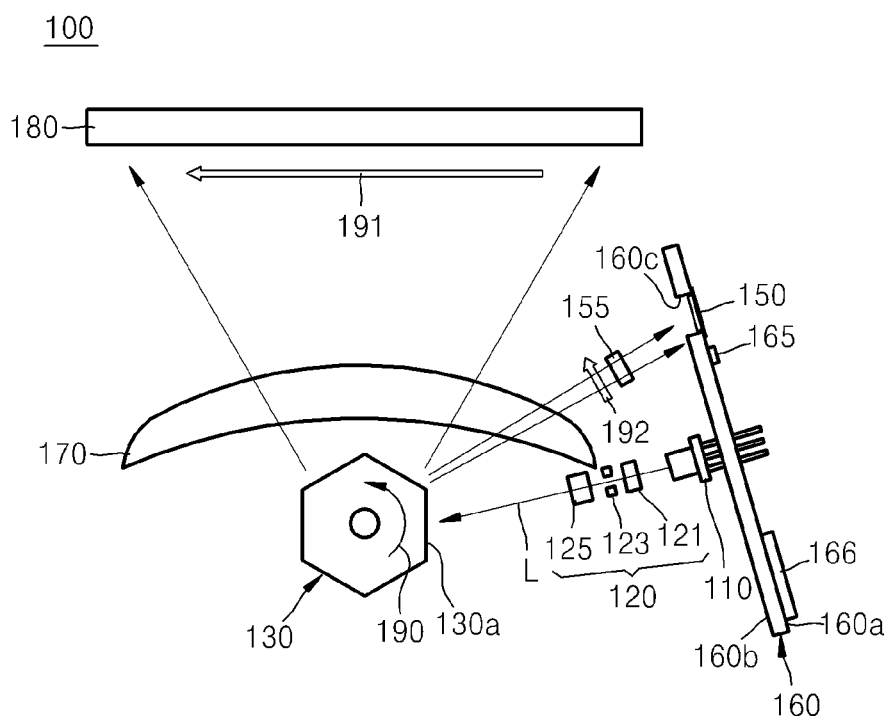
FIG. 1 is a schematic view illustrating an optical arrangement of a light scanning unit, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the present specification, a main scanning direction 191 denotes a scanning direction of a light beam L (see FIGS. 1, 3, 5, and 9) reflected and scanned by an beam deflector 130 (see FIGS. 1, 3, 5, and 9), and a sub-scanning direction denotes a direction in which a surface to be scanned moves by rotation of a photoconductive drum 180. The sub-scanning direction is perpendicular to a traveling direction of the light beam L deflected by the beam deflector 130 and to the main scanning direction 191. A light path of the light beam L may be changed by a light path changing member, for example, a reflection mirror, and thus the main scanning direction 191 and a sub-scanning direction may be changed according to the change in the light path.

Figure 2:
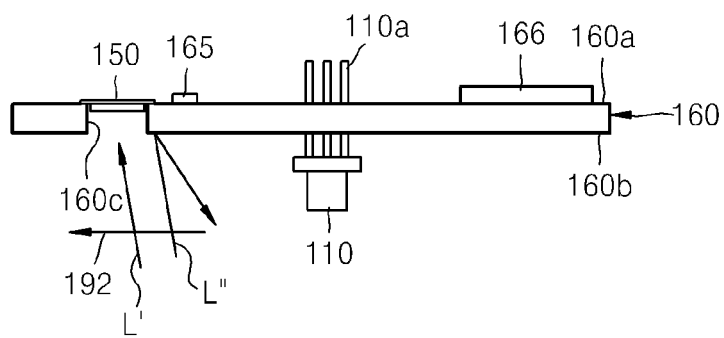
FIG. 2 is a cross-sectional side view of a circuit board on which a beam detecting sensor is mounted in the light scanning unit illustrated in FIG. 1.

FIG. 1 is a schematic view illustrating an optical arrangement of a light scanning unit 100, according to an exemplary embodiment of the present general inventive concept. FIG. 2 is a cross-sectional side view of a circuit board 160 on which a beam detecting sensor 150 is mounted in the light scanning unit 100 illustrated in FIG. 1.

Referring to FIGS. 1 and 2, the light scanning unit 100 includes a light source 110 to emit the light beam L and a beam deflector 130 to reflect and scan the light beam L emitted from the light source 110 in the main scanning direction 191 of the photoconductive drum 180. The light scanning unit 100 also includes a scanning lens 170 to focus the light beam L reflected and scanned by the beam deflector 130 on a surface to be scanned, which is illustrated in FIG. 1 as an outer circumferential surface of the photoconductive drum 180. The light scanning unit 100 also includes the beam detecting sensor 150 to detect a horizontal synchronization signal by receiving light beam L' from among the light beam L reflected and scanned by the beam deflector 130.

The light source 110 may be a laser diode. The beam deflector 130 may be, for example, a polygon mirror having a plurality of reflection surfaces 130a. As the beam deflector 130 revolves clockwise 190, the light beam L emitted from the light source 110 is reflected and scanned in the main scanning direction 191 toward the photoconductive drum 180. Alternatively, the beam deflector 130 may be a microelectromechanical systems (MEMS) mirror.

An incidence optical system 120 may be disposed on a light path between the light source 110 and the beam deflector 130. The incidence optical system 120 may include at least one of a collimating lens 121, a slit 123, and a cylindrical lens 125. The collimating lens 121 is a condensing lens to make the light beam L emitted from the light source 110 into parallel light or converging light. The slit 123 controls a diameter and a shape of the light beam L. The cylindrical lens 125 is an anamorphic lens that linearly-focuses the light beam L on a reflection surface of the beam deflector 130 in a direction corresponding to the main scanning direction 191 and/or the sub-scanning direction.

The scanning lens 170 is an imaging optical unit to focus the light beam L reflected and scanned by the beam deflector 130 on a surface of the photoconductive drum 180. The scanning lens 170 is disposed between the beam deflector 130 and the photoconductive drum 180. The scanning lens 170 may be, for example, an fθ lens that focuses and corrects the light beam L to be scanned on the surface such that the light beam L is scanned on the surface at a constant speed. FIG. 1 illustrates one scanning lens 170, but the present general inventive concept is not limited thereto, and thus two or more the scanning lenses 170 may be included. A reflection mirror (not shown) may further be disposed between the scanning lens 170 and the photoconductive drum 180 so as to change the light path.

The beam detecting sensor 150 is a device to detect the light beam L' from among the light beam L reflected and scanned by the beam deflector 130 and to generate a horizontal synchronization signal. The beam detecting sensor 150 may be, for example, a photo sensor integrated chip (IC). A package form of the beam detecting sensor 150 is not limited thereto. The beam detecting sensor 150 may have a surface mount type (SMT) package form such as Small Out-line L-Leaded Package (SOP), Shrink Small Out-line L-Leaded Package (SSOP), Thin Small Out-line L-Leaded Package (TSOP), Quad Flat L-Leaded Package (QFP), Small Out-line J-Leaded Package (SOJ), Quad Flat J-Leaded Package (QFJ), Quad Flat No Lead Package (QFN), and the like. The beam detecting sensor 150 may be disposed to receive the light beam L' corresponding to a starting end where main scanning starts on a scanning line of the light beam L.

The beam detecting sensor 150 is mounted on the circuit board 160. The circuit board 160 is mounted on a housing (not shown) of the light scanning unit 100. The circuit board 160 has a flat panel shape and includes a first surface 160a, on which the beam detecting sensor 150 is mounted, a second surface 160b, which is an opposite surface of the first surface 160a, and a through-hole 160c formed where the beam detecting sensor 150 is mounted. The beam detecting sensor 150 is mounted in such a way that a light-receiving portion (not shown) of the beam detecting sensor 150 faces a bottom surface, that is, the first surface 160a, of the circuit board 160. The light-receiving portion of the beam detecting sensor 150 is exposed to the light beam L via the through-hole 160c of the circuit board 160. The through-hole 160c is formed to be smaller than an area where the beam detecting sensor 150 is mounted, so that terminals (not shown) of the beam detecting sensor 150 are not exposed to the light beam L.

The through-hole 160c may be formed to be smaller than the light-receiving portion of the beam detecting sensor 150. In this case, the through-hole 160c may serve as a slit to regulate the shape of the light beam L' incident on the beam detecting sensor 150 so as to limit a range of the light beam L' to be detected by the beam detecting sensor 150, thereby increasing precision of the horizontal synchronization signal.

In the circuit board 160, the second surface 160b is disposed to face the light beam L' reflected and scanned by the beam deflector 130. Accordingly, the light beam L' reflected and scanned by the beam deflector 130 is incident on the beam detecting sensor 150 via the through-hole 160c. The first surface 160a is an opposite surface of the second surface 160b on which the light beam L' is incident, and thus the light beam L' reflected and scanned by the beam deflector 130 is prevented from being reflected by the terminals of the beam detecting sensor 150.

The circuit board 160 on which the beam detecting sensor 150 is mounted may further include an electronic component 165 to process the horizontal synchronization signal generated by the beam detecting sensor 150. The electronic component 165 and the beam detecting sensor 150 together may be mounted on the first surface 160a of the circuit board 160 during the same process. The first surface 160a of the circuit board 160 is an opposite surface of the second surface 160b on which the light beam L' is incident, and thus diffused reflection of the light beam L' due to the electronic component 165 may be prevented from occurring. Meanwhile, the beam detecting sensor 150 and the electronic component 165 together may be mounted on the circuit board 160, and thus a number of assembling processes may be reduced in a manufacturing process of the light scanning unit 100. Also, the beam detecting sensor 150 and the electronic component 165 may be mounted on the same surface, i.e. on the first surface 160a, and thus a possibility that external substances are attached to the light scanning unit 100 or that the light scanning unit 100 is damaged may be minimized, thereby preventing defects from being generated in the light scanning unit 100.

Furthermore, the light source 110 and the beam detecting sensor 150 together may be mounted on the circuit board 160. However, the present general inventive concept is not limited thereto, and thus the light source 110 and the beam detecting sensor 150 may be mounted on opposite surfaces of the circuit board 160, respectively. That is, the light source 110 may be mounted on the second surface 160b of the circuit board 160. Meanwhile, an electronic component 166 to control driving of the light source 110 and the electronic component 165 to process the horizontal synchronization signal generated by the beam detecting sensor 150 together may be mounted on the first surface 160a of the circuit board 160. The light source 110 may be installed after the circuit board 160 is installed to the housing.

A beam detecting lens 155 may be disposed between the beam deflector 130 and the beam detecting sensor 150. The beam detecting lens 155 may be a focusing lens to focus the light beam L' reflected by the beam deflector 130 on the beam detecting sensor 150.

In FIG. 1, the beam detecting sensor 150 is disposed at a light exit surface of the scanning lens 170, and thus the light beam L' directed to the beam detecting sensor 150 passes through the scanning lens 170, but the present general inventive concept is not limited thereto. The beam detecting sensor 150 may be disposed between the beam deflector 130 and the scanning lens 170 as the occasion demands, and thus the light beam L' may be directly incident on the beam detecting sensor 150 without passing through the scanning lens 170.

The beam detecting sensor 150 and the beam detecting lens 155 together constitute a synchronization signal detecting unit of the light scanning unit 100. The synchronization signal detecting unit of the current embodiment is disposed to receive the light beam L' corresponding to a starting end where main scanning starts on a scanning line of light beam, but the present invention is not limited thereto. For example, a synchronization detecting optical system according to an embodiment may be disposed to detect light beam corresponding to a finishing end where main scanning is finished on a scanning line of light beam. Also, the synchronization detecting optical system according to an embodiment may be disposed to detect both a light beam corresponding to a starting end where main scanning starts on a scanning line of the light beam and a finishing end where main scanning is finished on a scanning line of the light beam.

Hereinafter, operations of the light scanning unit 100 of the current embodiment will be described with reference to FIGS. 1 and 2.

If the light scanning unit 100 starts to operate, the beam deflector 130 is driven and the light beam L is emitted from the light source 110. The emitted light beam L is reflected by the reflection surface 130a of the beam deflector 130 and is scanned in the main scanning direction 191 according to revolution of the beam deflector 130. In this regard, the light beam L scanned from the reflection surface 130a of the beam deflector 130 forms a scanning line on a surface to be scanned which is an outer circumferential surface. The light beam L' corresponding to a starting end where main scanning starts on a scanning line is directed to the beam detecting sensor 150 via the beam detecting lens 155. In this regard, the light beam L' forms a line trajectory on the circuit board 160 in a traveling direction 192 of the light beam L' according to the revolution of the beam deflector 130, and the line trajectory crosses the through-hole 160c of the circuit board 160. The light beam L' incident on the through-hole 160c of the circuit board 160 is incident on the light-receiving portion of the beam detecting sensor 150. The light beam L' incident on the light-receiving portion of the beam detecting sensor 150 is converted into the light-receiving portion of the beam detecting sensor 150 through photoelectric conversion.

Light beam L" right before or right after being scanned on the through-hole 160c is reflected by the second surface 160b of the circuit board 160 and is not incident on the through-hole 160c, and thus the light beam L" is not detected by the beam detecting sensor 150. If the light beam L" right before or right after being scanned on the through-hole 160c is refracted or scattered, and thus is detected by the beam detecting sensor 150, the light beam L" consequentially acts as noise of the light beam L' to be detected, and accordingly the horizontal synchronization signal may be abnormally generated when an analog signal detected by the beam detecting sensor 150 is converted to a digital signal. Such an abnormal horizontal synchronization signal may cause problems, for example, an image is shifted for each scanning line, a shadow is formed in an image, an image is wholly shifted, and the like. On the other hand, the light scanning unit 100 prevents generation of the abnormal horizontal synchronization signal resulting due to refraction or scattering of the light beam L" right before or right after being scanned on the through-hole 160c. Furthermore, by radically removing noise of the horizontal synchronization signal that may be generated due to refraction/scattering noise, a burden of removing noise that may be generated during an examination process or in a subsequent usage environment may be reduced.

Figure 3:
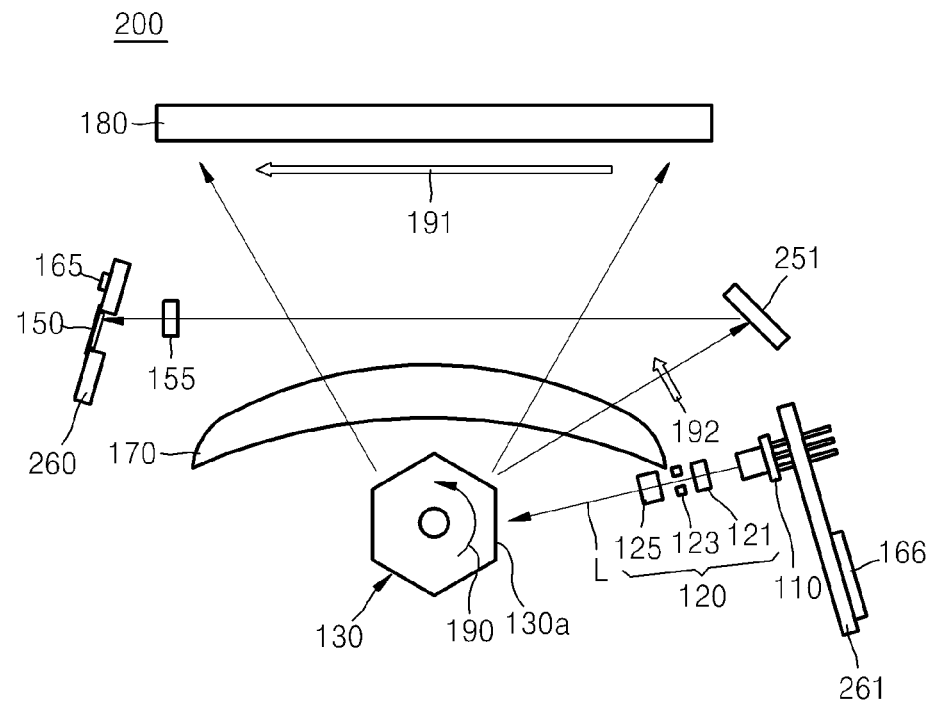
FIG. 3 is a schematic view illustrating an optical arrangement of a light scanning unit, according to another embodiment of the present general inventive concept.
Figure 4:
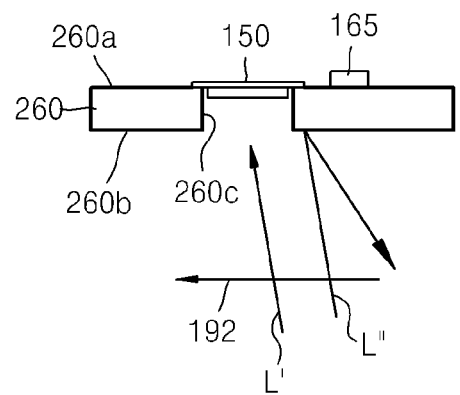
FIG. 4 is a cross-sectional side view of a circuit board on which a beam detecting sensor is mounted in the light scanning unit illustrated in FIG. 3.

FIG. 3 is a schematic view illustrating an optical arrangement of a light scanning unit 200, according to another embodiment of the present general inventive concept. FIG. 4 is a cross-sectional side view of a circuit board 261 on which a beam detecting sensor 150 is mounted in the light scanning unit 200 illustrated in FIG. 3.

Referring to FIGS. 3 and 4, the light scanning unit 200 of the current embodiment includes a light source 110 to emit a light beam L, a beam deflector 130 to reflect and scan the light beam L emitted from the light source 110 in a main scanning direction 191 of a photoconductive drum 180, a scanning lens 170 to focus the light beam L reflected and scanned by the beam deflector 130 on a surface to be scanned which is an outer circumferential surface of the photoconductive drum 180, and a beam detecting sensor 150 to detect a horizontal synchronization signal by receiving light beam L' from among the light beam L reflected and scanned by the beam deflector 130.

A difference between the light scanning unit 200 and the light scanning unit 100 lies in a position of the beam detecting sensor 150. That is, in the light scanning unit 100, the light source 110 and the beam detecting sensor 150 together are mounted on the circuit board 160. On the other hand, in the light scanning unit 200, the circuit board 260 on which the beam detecting sensor 150 is mounted is formed separately from the circuit board 261 on which the light source 110 is mounted, and the light scanning unit 200 further includes a beam detecting mirror 251 to change a path of synchronization detection light beam L'. By further including the beam detecting mirror 251, arrangement of the beam detecting sensor 150 may be more freely selected.

The beam detecting mirror 251 is disposed on a light path of the light beam L' corresponding to a starting end of a scanning line, wherein the light beam L' is a part of light beam L reflected by a reflection surface 130a of the beam deflector 130 and scanned in a main scanning direction 191. In FIG. 3, the beam detecting mirror 251 is disposed between the scanning lens 170 and the photoconductive drum 180, and thus the light beam L' directed to the beam detecting mirror 251 passes through the scanning lens 170, but the present general inventive concept is not limited thereto. The beam detecting mirror 251 may be disposed between the beam deflector 130 and the scanning lens 170 as the occasion demands, and thus the light beam L' may be directed to the beam detecting mirror 251 without passing through the scanning lens 170.

Similarly to the above-described embodiment, the beam detecting sensor 150 and an electronic component 165 together may be mounted on a first surface 260a of the circuit board 260. The circuit board 260 may be disposed in such a way that the light beam L' reflected and scanned by the beam deflector 130 is incident on a second surface 260b which is an opposite surface of the first surface 260a. A through-hole 260c of the circuit board 260 is formed to correspond to the beam detecting sensor 150. The beam detecting sensor 150 is mounted in such a way that a light-receiving portion (not shown) faces the first surface 260a of the circuit board 260. In this regard, the light-receiving portion of the beam detecting sensor 150 is exposed by the through-hole 260c of the circuit board 260. The through-hole 260c is formed to be larger than the light-receiving portion of the beam detecting sensor 150 and to be smaller than an area where the beam detecting sensor 150 is mounted. The through-hole 260c may serve as a slit for regulating the shape of the light beam L' incident on the beam detecting sensor 150 so as to limit a range of the light beam L' to be detected by the beam detecting sensor 150. The light beam L' reflected and scanned by the beam deflector 130 is incident on the beam detecting sensor 150 via the through-hole 260c. Light beam L" right before or right after being scanned on the through-hole 260c is blocked at the second surface 260b of the circuit board 260 and is not incident on the through-hole 260c, and thus the light beam L" is not detected by the beam detecting sensor 150. Accordingly, the light scanning unit 200 of the current embodiment radically prevents generation of an abnormal horizontal synchronization signal resulting due to refraction or scattering of the light beam L" right before or right after being scanned on the through-hole 260c. The first surface 260a is an opposite surface of the second surface 260b on which the light beam L' reflected and scanned by the beam deflector 130 is incident, and thus the light beam L' reflected and scanned by the beam deflector 130 is prevented from being reflected by terminals (not shown) of the beam detecting sensor 150.

Meanwhile, the beam detecting sensor 150 and the electronic component 165 together may be mounted on the circuit board 260 before the circuit board 260 is installed in a housing (not shown) of the light scanning unit 200 in a manufacturing process. In a manufacturing process of a conventional light scanning unit, a beam detecting sensor is mounted on a circuit board after the circuit board is installed in a housing, and thus the manufacturing process of the light scanning unit is complicated. On the other hand, in the light scanning unit 200 of the current embodiment, the beam detecting sensor 150 and the electronic component 165 together may be mounted on the circuit board 260 before the circuit board 260 is installed in the housing, and thus a manufacturing process of the light scanning unit 200 may be further simplified.

Figure 5:
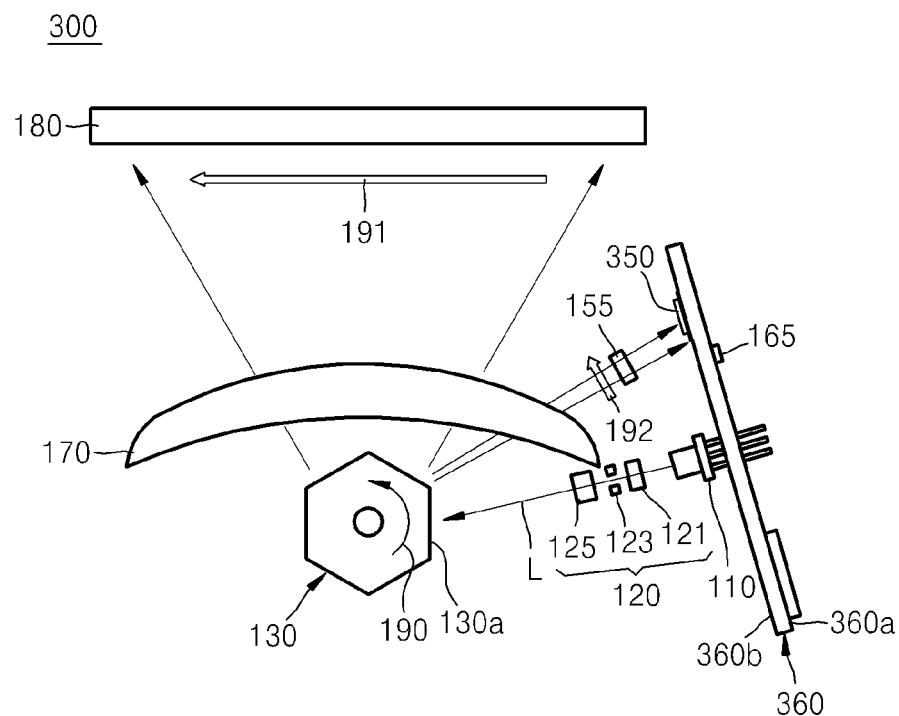
FIG. 5 is a schematic view illustrating an optical arrangement of a light scanning unit, according to another embodiment of the present general inventive concept.
Figure 6:
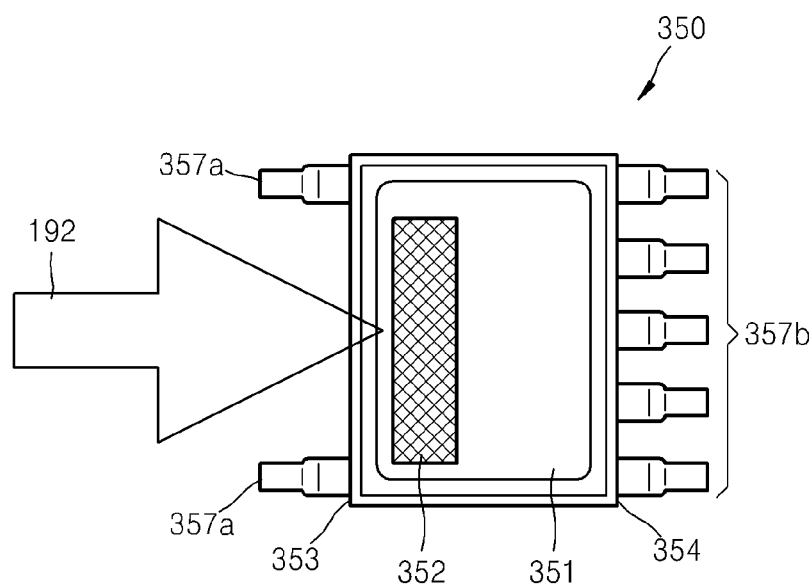
FIG. 6 is a plane view illustrating a circuit board on which a beam detecting sensor is mounted in the light scanning unit illustrated in FIG. 5.

FIG. 5 is a schematic view illustrating an optical arrangement of a light scanning unit 300, according to another embodiment of the present general inventive concept. FIG. 6 is a plane view illustrating a circuit board 360 on which a beam detecting sensor 350 is mounted in the light scanning unit 300 illustrated in FIG. 5.

Referring to FIGS. 5 and 6, the light scanning unit 300 of the current embodiment includes a light source 110 to emit a light beam L, a beam deflector 130 to reflect and scan the light beam L emitted from the light source 110 in a main scanning direction 191 of a photoconductive drum 180, a scanning lens 170 to focus the light beam L emitted from the light source 110 on a surface to be scanned which is an outer circumferential surface of the photoconductive drum 180, and a beam detecting sensor 350 to detect a horizontal synchronization signal by receiving light beam L' from among the light beam L reflected and scanned by the beam deflector 130.

The beam detecting sensor 350 may be a photo sensor IC. A difference between the beam detecting sensor 350 and the beam detecting sensor 150 lies in a position where the beam detecting sensor 350 is mounted on the circuit board 360. That is, in the above-described light scanning units 100 and 200, the beam detecting sensor 150 is mounted on the first surfaces 160a and 260a on which the light beam L' is not incident, wherein the first surface 160a is one surface of the both surfaces of the circuit board 160 and the first surface 260a is one surface of the both surfaces of the circuit board 260. On the other hand, in the light scanning unit 300, the beam detecting sensor 350 is mounted on a second surface 360b on which light beam L' is incident, wherein the second surface 360b is one surface of both surfaces of the circuit board 360.

The beam detecting sensor 350 is disposed in such a way that light beam L' is not irradiated onto a plurality of terminals 357a and 357b disposed on a front surface 353 of the beam detecting sensor 350. Here, the front surface 353 is a front side of the beam detecting sensor 350 with respect to a traveling direction 192 of the light beam L'. For example, as illustrated in FIG. 6, in the beam detecting sensor 350, a top surface 351 has a rectangular shape, and a light-receiving portion 352 having a rectangular shape may be disposed on the top surface 351. The beam detecting sensor 350 is mounted on the circuit board 360 in such a way that a lengthwise direction of the light-receiving portion 352 is perpendicular to the traveling direction 192 of the light beam L'. Meanwhile, the lead-shaped terminals 357a and 357b may be respectively disposed on the front surface 353 and a rear surface 354 of the beam detecting sensor 350 that are parallel to the lengthwise direction of the light-receiving portion 352. In this regard, the terminals 357a disposed on the front surface 353 of the beam detecting sensor 350 are spaced apart from each other across a trajectory of the light beam L' at an interval that is at least larger than a spot of the light beam L'. For example, when the plurality of terminals include ground terminals, the ground terminals disposed on the front surface 353 of the beam detecting sensor 350 and on the trajectory of the light beam L' may be removed and only the terminals 357a disposed at both edge portions of the front surface 353 may remain.

A package form of the beam detecting sensor 350 does not limit the current embodiment, except that the terminals 357a and 357b are not disposed on the trajectory of the light beam L' on the front surface 353 of the beam detecting sensor 350. For example, the beam detecting sensor 350 may have a Through-hole Mounting Type (THT) package form, for example, Dual In-line Package (DIP), in which lead pins penetrate and are mounted on the circuit board 360, or an SMT package form such as SOP, SSOP, TSOP, QFP, SOJ, QFJ, and the like.

Since the beam detecting sensor 350 is mounted on the second surface 360b of the circuit board 360, the light beam L' moves in the traveling direction 192 while being directly irradiated onto the top surface 351 on which the light-receiving portion 352 of the beam detecting sensor 350 is disposed. In a conventional beam detecting sensor, from among terminals disposed on a front surface of the beam detecting sensor, terminals on a trajectory of light beam L' are not removed, and thus diffused reflection occurs at the terminals on the trajectory of the light beam L', and consequently, the terminals on the trajectory of the light beam L' become noise for a horizontal synchronization signal. On the other hand, in the light scanning unit 300 of the current embodiment, the terminals 357a disposed on the front surface light scanning unit 300 of the beam detecting sensor 350 are not disposed on the trajectory of the light beam L' as illustrated in FIG. 6, thereby prevent generation of noise resulting due to diffused reflection occurring by metal leads for forming the terminals 357a before the light beam L' is scanned on the light-receiving portion 352 of the beam detecting sensor 350.

Figure 7:
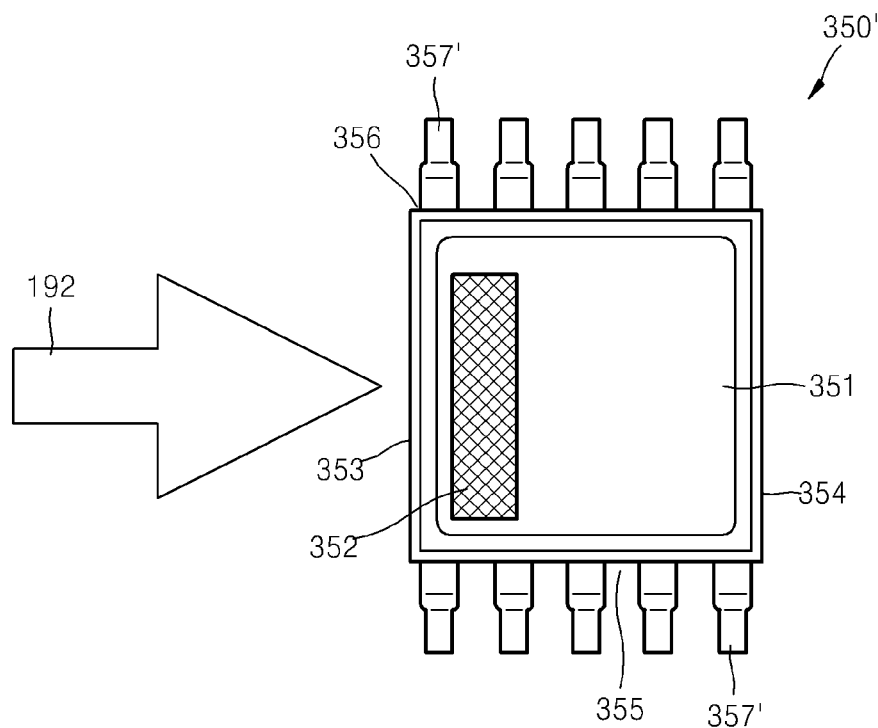
FIG. 7 is a view illustrating a beam detecting sensor that may be employed in the light scanning unit of FIG. 5, according to another embodiment of the present general inventive concept.

FIG. 7 is a view illustrating a beam detecting sensor that may be employed in the light scanning unit 300 of FIG. 5, according to another embodiment of the present general inventive concept.

In a beam detecting sensor 350' of the current embodiment, a top surface 351 of the beam detecting sensor 350' has a rectangular shape, and a light-receiving portion 352 having a rectangular shape may be disposed on the top surface 351. Compared to the beam detecting sensor 350 illustrated in FIG. 6, terminals 357' of the beam detecting sensor 350' of the current embodiment are arranged in a direction perpendicular to the direction in which the terminals 357a of the beam detecting sensor 350 illustrated in FIG. 6 are arranged. That is, the lead-shaped terminals 357' are disposed on both side surfaces 356 and 357 in a lengthwise direction of the light-receiving portion 352 of the beam detecting sensor 350'.

The beam detecting sensor 350' is mounted on a circuit board 360 so that the lengthwise direction of the light-receiving portion 352 is perpendicular to a traveling direction 192 of light beam L', and the terminals 357' are disposed on the both side surfaces 356 and 357 of the beam detecting sensor 350' across a trajectory of the light beam L', and thus the light beam L' may not be irradiated onto the terminals 357'.

Figure 8:
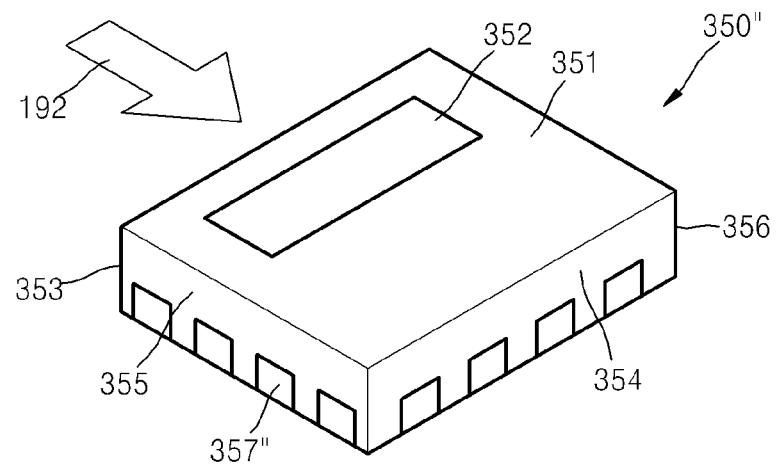
FIG. 8 is a view illustrating a beam detecting sensor that may be employed in the light scanning unit of FIG. 5, according to another embodiment of the present general inventive concept.

FIG. 8 is a view illustrating a beam detecting sensor that may be employed in the light scanning unit of FIG. 5, according to another embodiment of the present general inventive concept.

A beam detecting sensor 350" of the current embodiment may be a QFN or ball grid array (BGA) type package in which protruding lead-shaped terminals are not disposed on side surfaces 353, 354, 355, and 356. In the beam detecting sensor 350", a top surface 351 has a rectangular shape, and a light-receiving portion 352 having a rectangular shape may be disposed on the top surface 351. Meanwhile, terminals 357" do not protrude from the side surfaces 353, 354, 355, and 356 and thus are not exposed by light beam L' to be scanned, thereby preventing reflection by the terminals 357".

Figure 9:
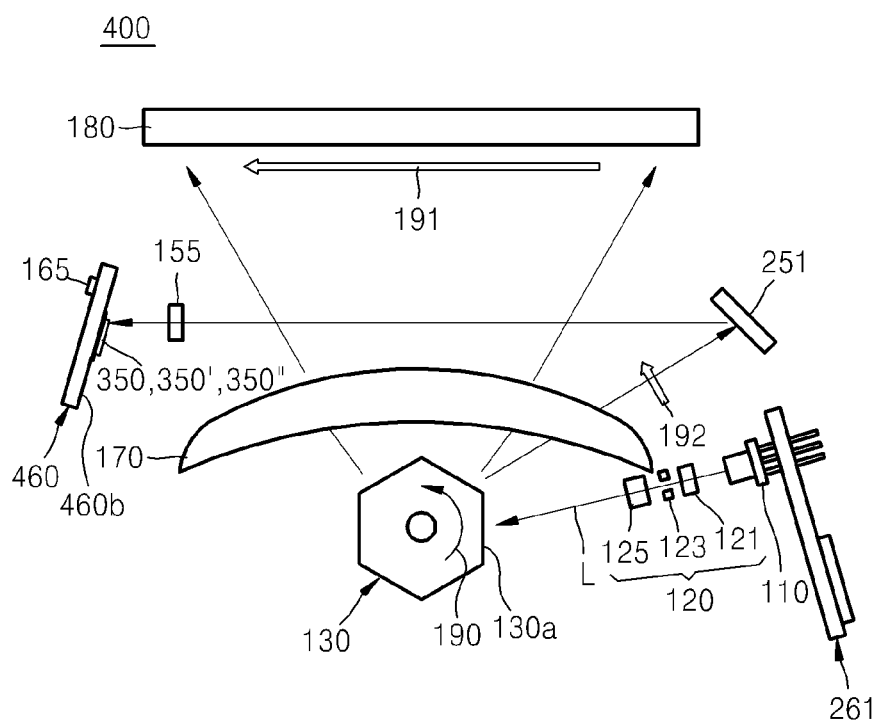
FIG. 9 is a schematic view illustrating an optical arrangement of a light scanning unit, according to another embodiment of the present general inventive concept.

FIG. 9 is a schematic view illustrating an optical arrangement of a light scanning unit 400, according to another embodiment of the present general inventive concept.

Referring to FIG. 9, the light scanning unit 400 of the current embodiment includes a light source 110 for emitting light beam L, a beam deflector 130 for reflecting and scanning the light beam L emitted from the light source 110 in the main scanning direction 191 of the photoconductive drum 180, a scanning lens 170 for focusing the light beam L reflected and scanned by the beam deflector 130 on a surface to be scanned, which is an outer circumferential surface of the photoconductive drum 180, and beam detecting sensors 350, 350', and 350" for detecting a horizontal synchronization signal by receiving light beam L' from among the light beam L reflected and scanned by the beam deflector 130.

A difference between the light scanning unit 400 of the current embodiment and the light scanning unit 300 described with reference to FIGS. 5 to 8 lies in positions of the beam detecting sensors 350, 350', and 350". The positions of the beam detecting sensors 350, 350', and 350" are substantially the same. That is, in the light scanning unit 300 of the above-described embodiment, the light source 110 and the beam detecting sensor together are mounted on the circuit board 360. On the other hand, in the light scanning unit 400 of the current embodiment, the circuit board 260 on which the beam detecting sensors 350, 350', and 350" are mounted is formed separately from the circuit board 261 on which the light source 110 is mounted, and the light scanning unit 200 further includes a beam detecting mirror 251 for changing a path of synchronization detection light beam L'.

Similarly to the beam detecting sensor of the above-described embodiment, the beam detecting sensors 350, 350', and 350" are mounted on a second surface 460b of a circuit board 460, and the circuit board 460 is disposed in such a way that the light beam L' reflected and scanned by the beam deflector 130 is incident on the second surface 460b.

The beam detecting sensors 350, 350', and 350" of the current embodiment are disposed in such a way that the light beam L' is not irradiated onto the terminals, i.e. the terminals 357a and 357b of FIG. 6, the terminals 357' of FIG. 7, and the terminals 357" of FIG. 8, thereby preventing reflection by the terminals 357a, 357b, 357', and 357".

Figure 10:
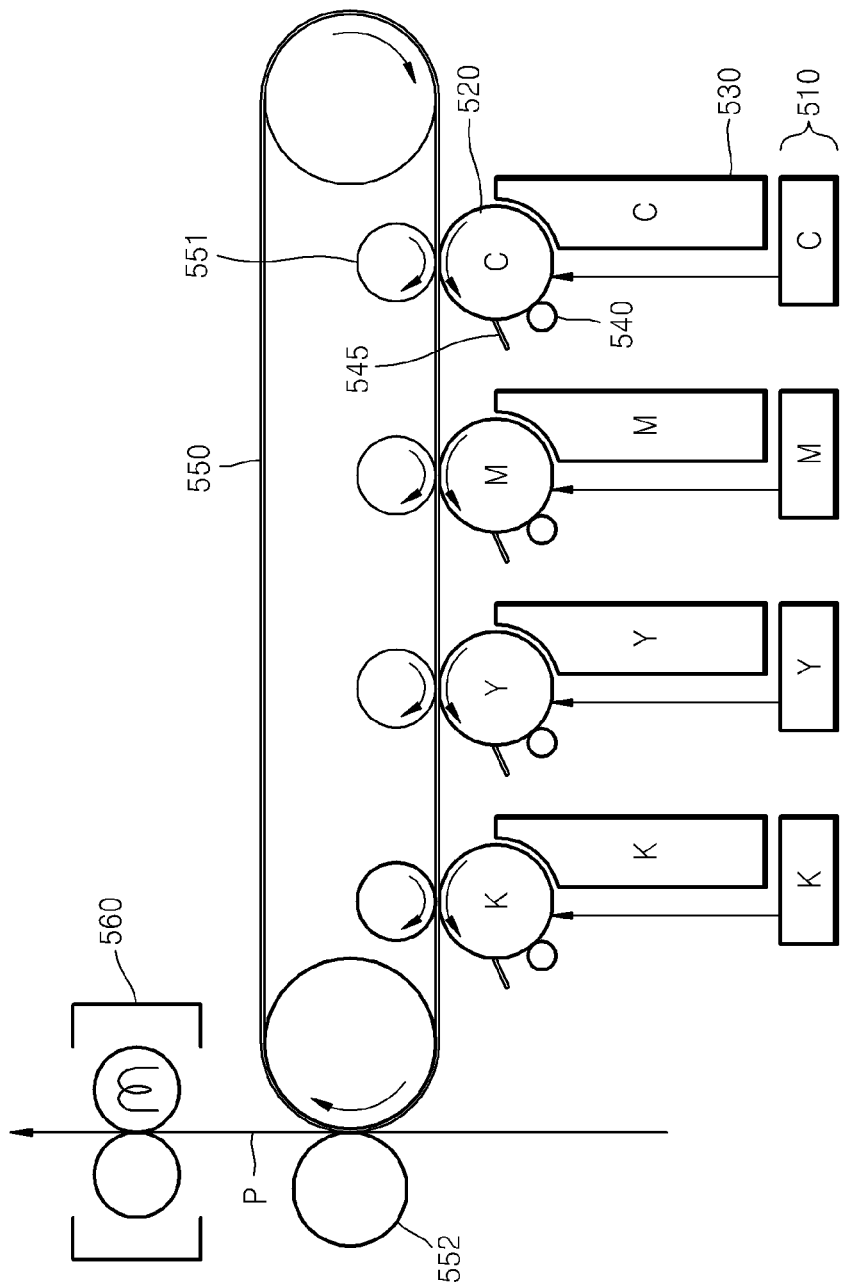
FIG. 10 is a schematic view of an electrophotographic image forming apparatus employing a light scanning unit, according to another embodiment of the present general inventive concept.

FIG. 10 is a schematic view of an electrophotographic image forming apparatus employing a plurality of light scanning units, according to another embodiment of the present invention.

Referring to FIG. 10, the electrophotographic image forming apparatus may include the plurality of light scanning units 510, a plurality of photoconductive drums 520, a plurality of developing units 530, a plurality of charging rollers 540, an intermediate transfer belt 550, a transfer roller 552, and a fixing unit 560.

In order to print a color image, the light scanning unit 510, the photoconductive drum 520, and the developing unit 530 may be disposed for each color. The light scanning unit 510 disposed for each color may use any of the light scanning units 100, 200, 300, and 400 of the above-described embodiments. The light scanning units 510 scan four light on the four photoconductive drums 520, respectively.

The photoconductive drum 520 is a photoreceptor and includes a photosensitive layer having a predetermined thickness on an outer circumferential surface of a cylindrical metal pipe. Although not shown in FIG. 10, a photosensitive belt may be used as the photoreceptor. The outer circumferential surface of the photoconductive drum 520 is a surface to be scanned. When the light scanning unit 510 exposes a surface to be exposed of the photoconductive drum 520 in a lengthwise direction and the surface to be exposed moves in a sub-scanning direction according to revolution of the photoconductive drum 520, a two-dimensional electrostatic latent image is formed on the surface to be exposed of the photoconductive drum 520.

Electrostatic latent images corresponding to black (K), magenta (M), yellow (Y), and cyan (C) image information are respectively formed in the four photoconductive drums 520. The four developing units 530 form K, M, Y, and C toner images by respectively supplying K, M, Y, and C toners to the four photoconductive drums 520.

The charging roller 540 is disposed on an upstream portion of the outer circumferential surface of the photoconductive drum 520, wherein the outer circumferential surface is exposed by the light scanning unit 510. The charging roller 540 is a charger that contacts the photoconductive drum 520 and revolves to charge a surface thereof to a uniform potential. A charging bias is applied to the charging roller 540. Alternatively, a corona charger (not shown) may be used as the charging roller 540.

The intermediate transfer belt 550 is an intermediate transcriptional unit for transferring the toner images of the photoconductive drums 520 to a printing medium P. Alternatively, an intermediate transfer drum may be used as the intermediate transfer belt 550. The intermediate transfer belt 550 is driven while contacting the photoconductive drums 520. The K, M, Y, and C toner images respectively formed in the photoconductive drums 520 are transferred to the intermediate transfer belt 550 by contacting the intermediate transfer belt 550 by a first transfer bias applied to a plurality of first transfer rollers 551. Each of a plurality of cleaning units 545 may be disposed on a lower stream of a point where a transfer operation is performed on the outer circumferential surface of the photoconductive drum 520. The toner images remaining after the transfer operation is performed are removed by the cleaning units 545. The toner images transferred to the intermediate transfer belt 550 are transferred to the printing medium P by a second transfer bias applied to a second transfer roller 552.

The printing medium P to which the toner images are transferred are sent to the fixing unit 560. The toner images transferred to the printing medium P are fixed on the printing medium P by receiving heat and pressure from a fixing nip, thereby completing a printing operation.

The electrophotographic image forming apparatus of the current embodiment has been described regarding a case where color images are formed, but the present invention is not limited thereto. For example, when a black solid color image is formed, the electrophotographic image forming apparatus may include only one light scanning unit 510, one photoconductive drum 520, and one developing unit 530. Furthermore, in the electrophotographic image forming apparatus of the current embodiment, the rest of components except for the light scanning units 510, that is, the photoconductive drums 520, the developing units 530, the intermediate transfer belt 550, the first and second transfer rollers 551 and 552, the fixing unit 560, etc. have been described as examples of printing units for transferring a toner image to a printing medium by using an electrophotographic method, and a well-know printing unit may be used as the image forming apparatus according to the present invention.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A light scanning unit comprising:
a light source to emit a light beam;
a beam deflector to reflect and scan the light beam emitted from the light source in a main scanning direction;
a beam detecting sensor including
a photo sensor integrated chip (IC) with a light-receiving portion to receive a portion of the light beam reflected and scanned by the beam deflector, and terminals connected to the photo sensor IC; and
a circuit board on which the light source and the beam detecting sensor are mounted,
wherein the light source is located on a first surface of the circuit board and emits the light beam, which faces the beam deflector, that is opposite to a second surface of the circuit board, which faces away from the beam deflector, the beam detecting sensor being mounted on the second surface of the circuit board.

2. The light scanning unit of claim 1, further comprising: electronic components to process signals input/output to/from the beam detecting sensor and mounted to the second surface of the circuit board.

3. The light scanning unit of claim 1, wherein the beam detecting sensor is disposed to receive a portion of the light beam which corresponds to a starting end of a scanning line from among the light beam reflected and scanned by the beam deflector.

4. The light scanning unit of claim 1, wherein the beam detecting sensor includes a photo sensor integrated chip (IC).

5. The light scanning unit of claim 1, further comprising:
a beam detecting lens disposed between the beam deflector and the beam detecting sensor to focus the light beam on the beam detecting sensor.

6. The light scanning unit of claim 1, further comprising:
a beam detecting mirror disposed between the beam deflector and the beam detecting sensor to change a path of the light beam.

7. The light scanning unit of claim 1, wherein the beam deflector includes at least one of a polygonal rotating mirror and a microelectromechanical systems (MEMS) mirror.

8. A light scanning unit comprising:
a light source to emit a light beam;
a beam deflector to scan the light beam emitted from the light source in a main scanning direction;
a circuit board disposed in part of a trajectory of the light beam such that the light beam is projected on a first surface of the circuit board which faces the beam deflector;
a beam detecting sensor including a photo sensor integrated chip (IC), the beam detecting sensor being mounted on a second surface of the circuit board, which faces away from the beam deflector and is opposite the first surface of the circuit board, to detect a horizontal synchronization signal by receiving a portion of the light beam scanned by the beam deflector, the beam detecting sensor including a plurality of terminals connected to the photo sensor IC to output the horizontal synchronization signal and disposed on the second surface of the circuit board such that the light beam is not incident on the plurality of terminals,
wherein the plurality of terminals are disposed on a surface of the beam detecting sensor which faces the second surface of the circuit board.

9. The light scanning unit of claim 8, wherein the beam detecting sensor includes at least one of a ball grid array (BGA) type package and a quad flat no-leads (QFN) type package.

10. The light scanning unit of claim 8, further comprising:
electronic components to process signals input/output to/from the beam detecting sensor and mounted on a second surface of the circuit board which is opposite to the first surface of the circuit board.

11. The light scanning unit of claim 8, wherein the beam detecting sensor is disposed to receive light beam corresponding to a starting end of a scanning line from among the light beam reflected and scanned by the beam deflector.

12. The light scanning unit of claim 8, wherein the beam detecting sensor includes a photo sensor integrated chip (IC).

13. The light scanning unit of claim 8, further comprising:
a beam detecting mirror disposed between the beam deflector and the beam detecting sensor to change a path of the light beam.

14. The light scanning unit of claim 1, wherein the light source and the beam detecting sensor are mounted on the circuit board.

15. The light scanning unit of claim 1, wherein the light source is mounted on a light source circuit board separate from the circuit board.

16. An electrophotographic image forming apparatus comprising:
a photoreceptor;
a light scanning unit to form an electrostatic latent image by scanning light on a surface of the photoreceptor; and
a developing unit to develop the electrostatic latent image formed on the photoreceptor by supplying a toner to the electrostatic latent image,
wherein the light scanning unit comprises:
a light source being located on a first surface of the circuit board and emits a light beam;

a beam deflector to scan the light beam emitted from the light source in a main scanning direction;

a circuit board disposed in part of a trajectory of the light beam; and a beam detecting sensor including a photo sensor integrated chip (IC) mounted on a second surface of the circuit board, which faces away from the beam deflector and is opposite to the first surface of the circuit board, to detect a horizontal synchronization signal by receiving a portion of the light beam scanned by the beam deflector, the beam detecting sensor including a plurality of terminals that are connected to the photo sensor IC to output the horizontal synchronization signal and disposed such that the light beam is not incident on the plurality of terminals, wherein the plurality of terminals are disposed on the second surface of the circuit board, and the light beam is obstructed from reaching the plurality of terminals by the placement of the beam detecting sensor and the plurality of terminals on the second surface of the circuit board.

17. The light scanning unit of claim 1, wherein an initial contact point on the circuit board of the beam detecting sensor is on the second surface of the circuit board.

18. The light scanning unit of claim 1, wherein an initial contact point on the circuit board of the terminals of the beam detecting sensor is on the second surface of the service board.

* * * * *